United States Patent
Mayer

[15] 3,648,781
[45] Mar. 14, 1972

[54] HINGE BEAM FOR DISK HARROWS

[72] Inventor: Walter Mayer, Stockton, Calif.

[73] Assignee: International Harvester Company, Chicago, Ill.

[22] Filed: Jan. 6, 1970

[21] Appl. No.: 997

[52] U.S. Cl. ............................172/568, 172/580, 172/596
[51] Int. Cl. .....................................A01b 23/06, A01b 35/16
[58] Field of Search...................172/580, 597, 596, 568, 583

[56] References Cited

UNITED STATES PATENTS

| | | |
|---|---|---|
| 2,604,746 | 7/1952 | Frank et al..............................172/568 |
| 3,519,085 | 7/1970 | Heckathorn et al. ...................172/597 |
| 2,981,345 | 4/1961 | Hamilton................................172/597 |
| 3,033,295 | 5/1962 | Brundage................................172/597 |

Primary Examiner—Robert E. Pulfrey
Assistant Examiner—Stephen C. Pellegrino
Attorney—Floyd B. Harman

[57] ABSTRACT

An agricultural implement having front and rear gangs of earth working tools being interconnected in such a manner that the gangs may be easily adjusted relative to each other to prevent the twisting of the gangs caused by forces acting on the gangs as the implement works the soil.

2 Claims, 6 Drawing Figures

PATENTED MAR 14 1972

INVENTOR
WALTER MAYER

BY

ATT'Y.

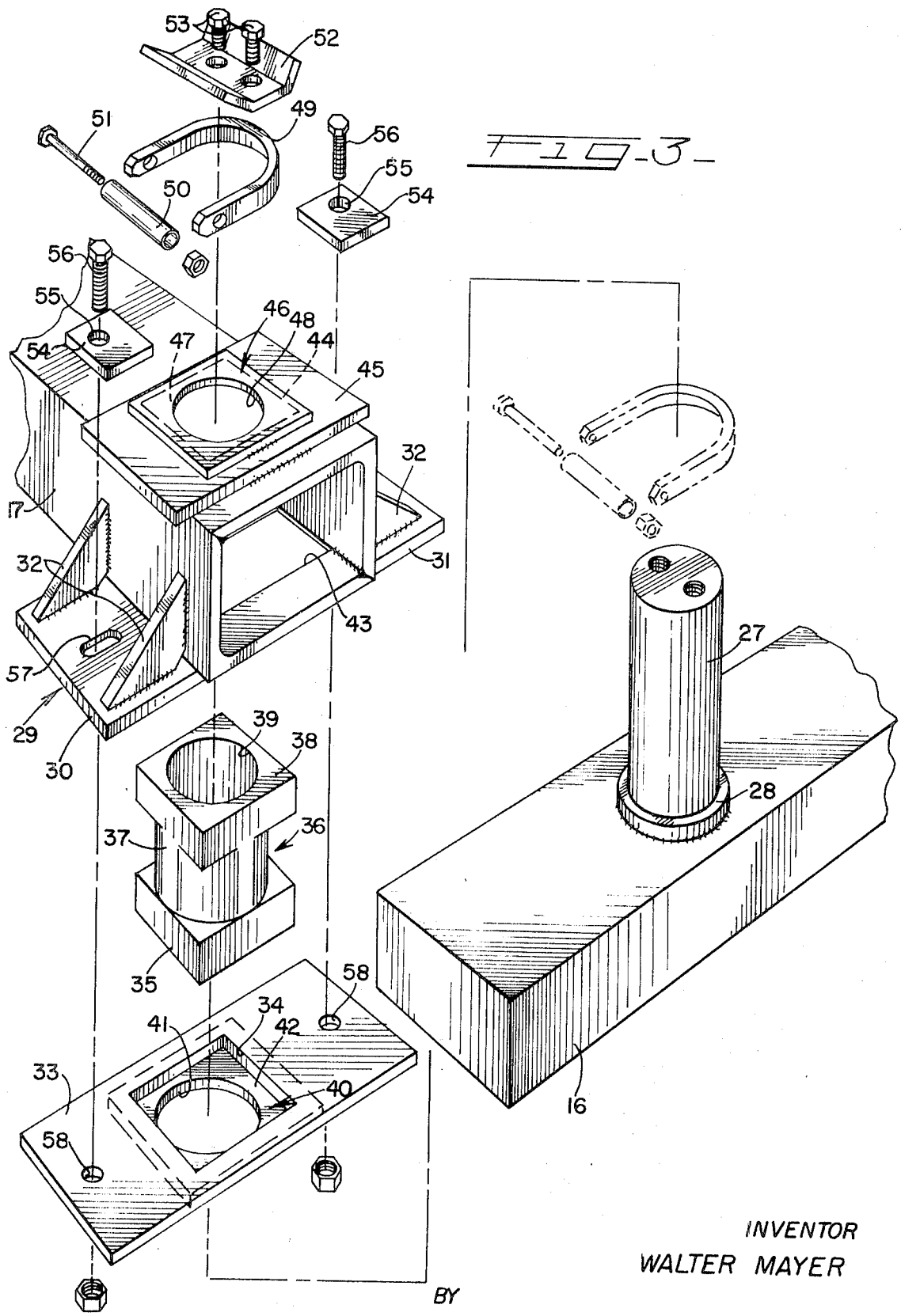

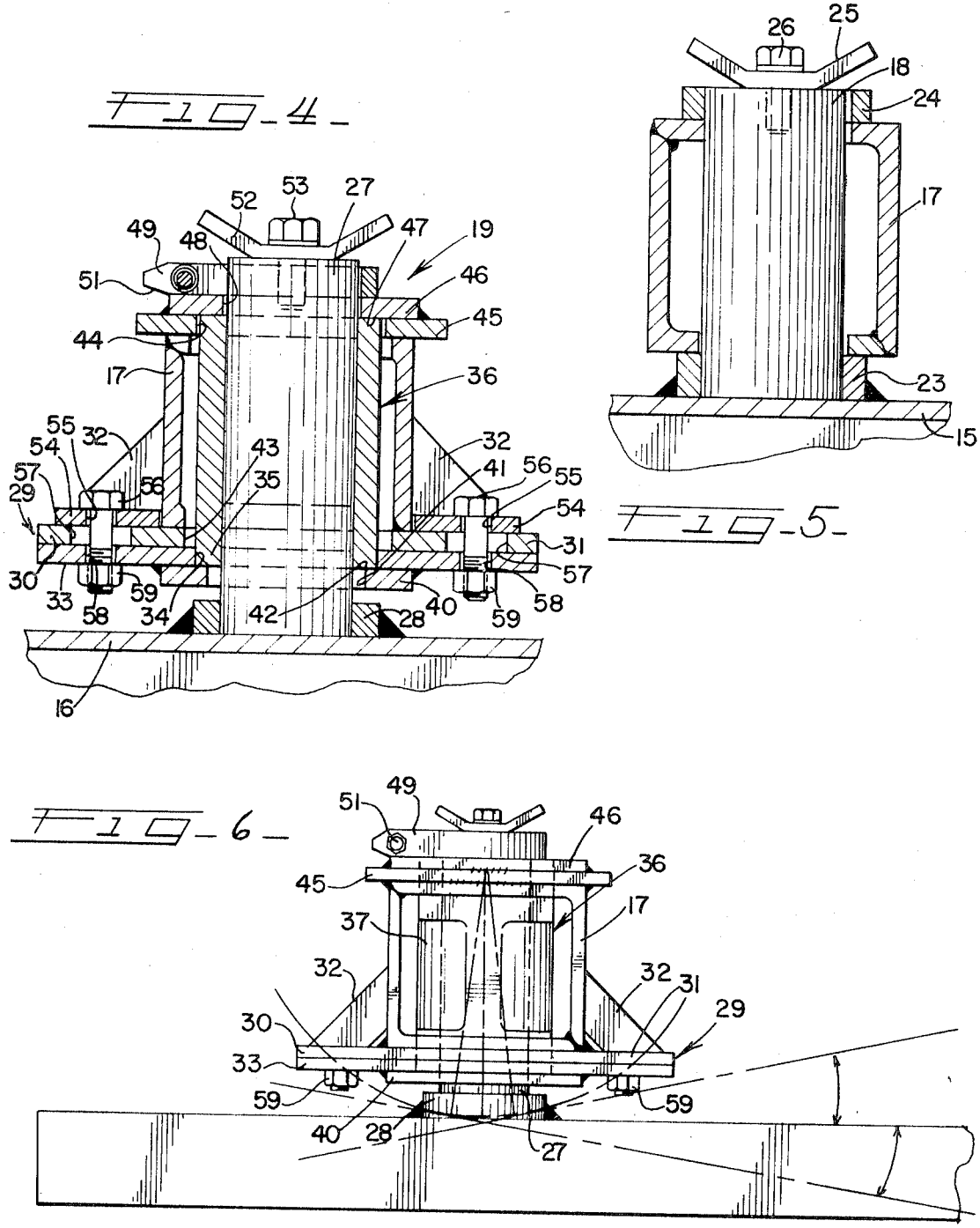

HINGE BEAM FOR DISK HARROWS

BACKGROUND AND SUMMARY OF THE INVENTION

The present invention relates to agricultural implements and particularly to disk harrows. Specifically, the invention relates to a disk harrow of the offset type.

Disk harrows of the class contemplated by this invention comprise front and rear gang sections connected at one end on vertical axes for horizontal swinging between a parallel or transport position, and an angled or operating position. The discs of one section have their concave sides facing in the opposite direction from the discs of the other section, and in operation the forces acting on the disc gangs must be resisted by the connections between the gangs.

For example, in a right-hand offset harrow the concavity of the discs of the front gang faces to the right and that of the rear gang faces to the left, and the concave end of each gang tends to dig deeper than the opposite end thereof. Thus, forces are set up between the gangs of a harrow wherein the front gang of a right-hand offset disc harrow is subjected to forces which tend to rotate it to the right about a longitudinal axis, while the rear gang tends to rotate to the left on a longitudinal axis. These forces increase with the increase in working angle between the gangs. It is necessary to overcome these forces to insure that the implement will operate at a uniform depth of penetration of the discs and to balance the cuts and fills so that the soil is smooth and free from ridges and furrows.

It is, therefore, an object of this invention to provide a means for adjusting a disc harrow to overcome the forces acting on the disc gangs.

Another object of this invention is to provide means for adjusting the rear gang of the disc harrow in order to provide for uniform penetration of the discs through the soil.

A further object of the invention is the provision of a novel means for adjusting the rear gang of a disk harrow to balance the cuts and fills created by the discs so that the soil is smooth and free from ridges and furrows.

BRIEF DESCRIPTION OF THE DRAWINGS

FIG. 3 is an exploded view of a portion of the structure shown in FIG. 2;

FIG. 4 is a section taken generally along line 4—4 of FIG. 2;

FIG. 5 is a section taken generally along line 5—5 of FIG. 2; and

FIG. 6 is a view in rear elevation of the structure shown in FIG. 2.

DESCRIPTION OF THE PREFERRED EMBODIMENT

Figures 1, 2:
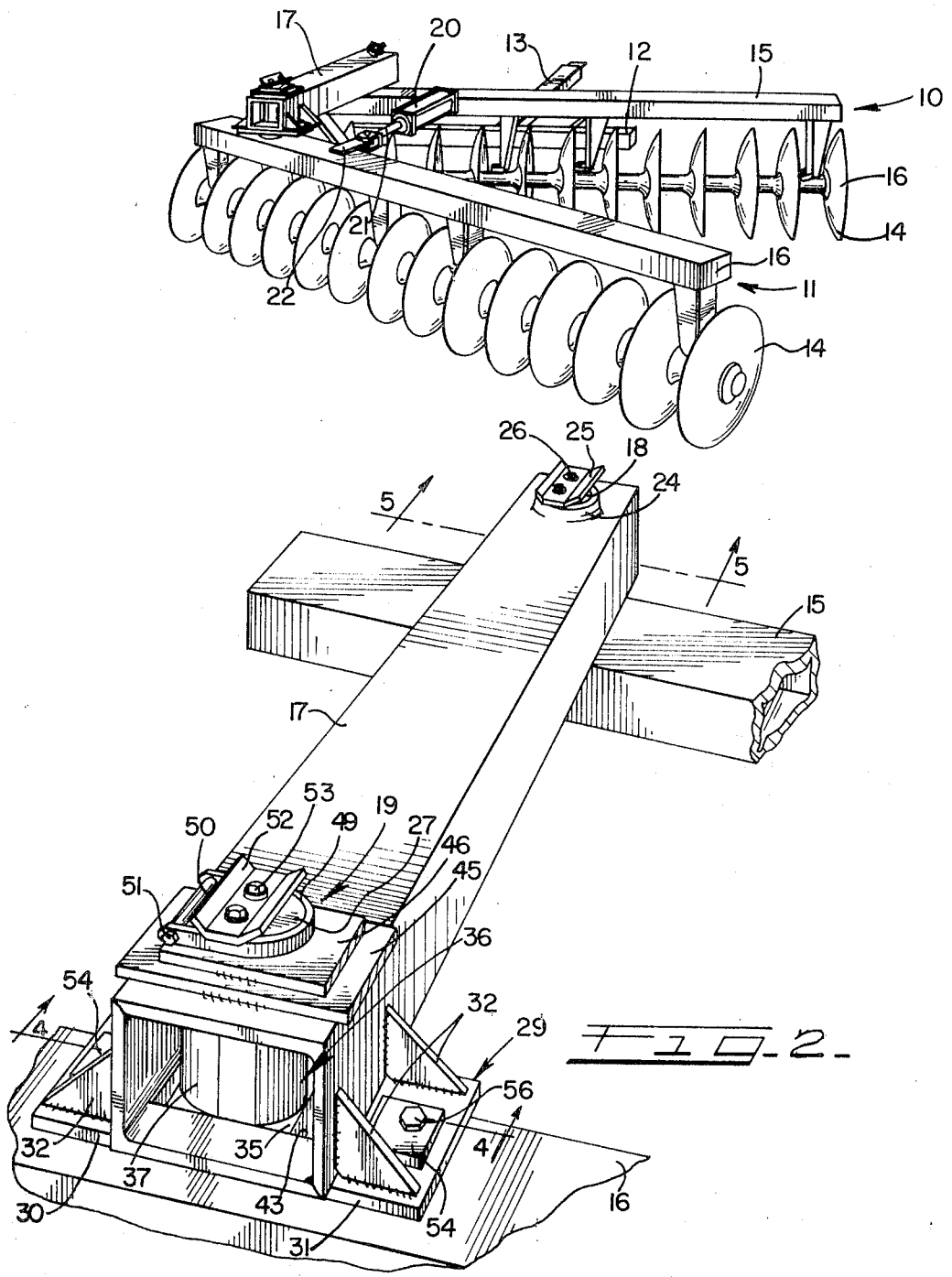
FIG. 1 is a perspective view of a disk harrow embodying the features of this invention shown in an angled or operating position.
FIG. 2 is an enlarged perspective view of a detail of a portion of the structure shown in FIG. 1.

In the drawings the numerals 10 and 11 refer, respectively, to the front and rear gangs of a disk harrow having a transversely extending draft bar 12 and drawbar 13 adapted for connection to a tractive vehicle, not shown, by which the implement may be propelled over the ground. The harrow gangs 10 and 11 include transversely aligned discs 14, the front gang 10 including frame member 15 upon which a plurality of discs 14 are mounted the concave sides of which are directed to the right of the direction of travel in FIG. 1.

The rear disk gang 11 comprises a transverse frame member 16 supporting a plurality of discs 14, the concave faces of which are directed to the left of the direction of travel in FIG. 1.

The front harrow gang 10 and the rear harrow gang 11 are interconnected at one end by a hinge beam member 17. The beam member 17 is pivotally connected to the front harrow gang 10 on a pivot member 18 and is pivotally connected to the rear harrow gang 11 by a hinge assembly designated at 19.

Control of the swinging of the harrow sections 10 and 11 relative to each other to selected angled operating positions may be accomplished by any suitable means but preferably by means of a hydraulic ram comprising a cylinder 20 pivotally mounted on the front frame member 15 and projecting rearwardly therefrom, and a piston rod 21 pivotally connected to a lug 22 fixed to the rear frame member 16.

As best shown in FIG. 5, a spindle 18 is affixed to a base 23 which in turn is affixed to front frame member 15 and projects upwardly through openings in beam 17 with its upper end received in a boss 24 on the upper surface of the beam, vertical displacement being prevented by a plate 25 secured to the upper end of the spindle 18 by bolts 26.

In order to compensate for the twisting forces acting on the implement by virtue of the right end of the front gang 10 and the left end of rear gang 11 tending to penetrate deeper into the soil than the opposite ends thereof, provision is made and hereinafter described for vertically lowering the right-hand end of the rear gang relative to the right-hand end of the front gang so that the discs of both gangs will penetrate evenly under the draft forces acting on the implement, and this is accomplished by mounting the rear frame member 16 on the hinge beam 17 by means accommodating angular adjustment of the rear frame member relative to the hinge beam about a horizontal axis extending in the direction of travel.

A vertical hinge member or spindle 27 is affixed to a base 28 which, in turn, is affixed to frame member 16. A plate 29 is welded to the lower face of hinge beam 17 and projects from the sides thereof to form lateral flanges 30 and 31, and is further secured to the hinge beam by diagonal straps 32.

Plate 29 rests upon a laterally shiftable plate 33 having a square opening 34 therein adapted to receive and mate with the square base 35 of a bearing 36 having a cylindrical central portion 37, an upper square portion 38 of the same dimensions as the base 35 and having a central bore 39 adapted to rotatably receive spindle 27.

Bearing 36 is held against vertical displacement by the provision of a retainer 40 welded to the lower face of plate 33 and having a circular opening 41 therein to receive hinge member 27 and providing a shoulder 42 upon which the base 35 of bearing 36 rests.

Plate 29 has a rectangular opening 43 having a fore and aft dimension equal to the dimension of the square of the portion 35 of bearing 36, but with an elongated transverse dimension, as best shown in FIG. 2, to accommodate relative movement between the lower portion of the bearing and beam member 17.

The square upper end 38 of bearing 36 is receivable in a square opening 44 of the same dimensions and provided in a plate 45 affixed, as by welding, to the upper face of hinge beam 17. A retainer 46 similar to retainer 40 is welded to plate 45 and forms a shoulder 47 engaging the upper end of the bearing. A circular opening 48 in retainer 46 loosely receives the upper portion of spindle or hinge member 27, the upper projecting end of hinge member 27 having mounted thereon a U-shaped removable spacer in the form of a bale 49 having its ends spaced by a sleeve 50 and connected by a bolt 51. Vertical displacement of the parts is prevented by the provision of an angled clamping plate 52 secured to the upper end of spindle 27 by bolts 53.

In order to vary the vertical spacing between front and rear frame members 15 and 16, if desired, spacer 49 may be removed from the upper end of spindle 27 and inserted between lower retainer 40 and base 28 as shown in phantom in FIG. 3.

FIG. 6 indicates the relative angular adjustment that may be made between frame member 16 and hinge beam 17 about a horizontal longitudinal axis at the upper portion of spindle 27. A pair of vernier plates 54, having an offcenter circular opening 55 to receive a bolt 56, are positioned above the slots 57 in plate 29 on both sides of the hinge beam 17, so that the bolts 56 extend in lieu thereof through the slots 57 in plate 29 and the circular openings 58 in plate 33. The vernier plates are then rotated about the axis of bolts 56 until a minimum clearance is obtained between an edge of the vernier plate and the side of the hinge beam 17, as best shown in FIG. 2. The vernier plates then retain the relative angular adjustment made between frame member 16 and hinge beam 17 by securing the position of bolts 56 by installing and tightening nuts 59.

What is claimed is:

1. In a disc harrow having front and rear disc gang members, interconnecting means comprising a hinge member having a substantially upright pivot member at each end, pivot members carried by said front and rear gang members for cooperation with said upright pivot members to connect said disc gang members for relative horizontal movement of said gang members, said hinge member including; means for providing an adjustment of one of said upright pivot members in a vertical plane along the longitudinal axis of said gang members, and retaining means carried by said hinge member to selectively position said one of said upright pivot members in any of a plurality of positions in said vertical plane.

2. In a disc harrow having front and rear disc gang frame members, interconnecting means comprising a hinge member connecting said disc gang frame members, said hinge member including; means to pivotally connect one end of said hinge member to one of said gang frame members, hinge means interconnecting said hinge member and the other of said frame members for horizontal swinging of the frame member relative to the hinge member about a vertical axis, said hinge means including means for angularly adjusting said other frame member in a vertical plane relative to the hinge member about a horizontal longitudinal axis, and means for holding said other frame member in a selected adjusted position; said means for angularly adjusting said other frame member including a spindle projecting vertically from said other frame member and a bearing member for receiving said spindle, means mounting said bearing member on said hinge member such that it can be angularly adjusted about a horizontal axis.

* * * * *